(12) United States Patent
Zhang et al.

(10) Patent No.: US 12,011,769 B2
(45) Date of Patent: Jun. 18, 2024

(54) EFFICIENT BRAKE DISC PROCESSING DEVICE

(71) Applicant: Longkou Tiangong Machinery Parts Co., LTD, Yantai (CN)

(72) Inventors: Keyang Zhang, Yantai (CN); Fuxing Zhang, Yantai (CN)

(73) Assignee: LONGKOU TIANGONG MACHINERY PARTS CO., LTD, Yantai (CN)

( * ) Notice: Subject to any disclaimer, the term of this patent is extended or adjusted under 35 U.S.C. 154(b) by 0 days.

(21) Appl. No.: 18/542,869

(22) Filed: Dec. 18, 2023

(65) Prior Publication Data

US 2024/0123509 A1  Apr. 18, 2024

(30) Foreign Application Priority Data

Dec. 21, 2022 (CN) .......................... 202211644478.9

(51) Int. Cl.
*B23B 3/12* (2006.01)
*B23B 3/30* (2006.01)
(Continued)

(52) U.S. Cl.
CPC ................ *B23B 5/02* (2013.01); *B23B 11/00* (2013.01); *B23B 13/04* (2013.01);
(Continued)

(58) Field of Classification Search
CPC .................. Y10T 279/18; Y10T 29/511; Y10T 29/5109–5114; Y10T 82/2524;
(Continued)

(56) References Cited

U.S. PATENT DOCUMENTS 3,336,902 A * 8/1967 Upton ...................... G02B 7/02
279/106
4,442,739 A * 4/1984 Swanson, Jr. ............ B23Q 7/18
82/122
(Continued)

FOREIGN PATENT DOCUMENTS

CN 111761079 A * 10/2020
CN 212858730 U * 4/2021
(Continued)

OTHER PUBLICATIONS

Machine Translation of CN 113400027 A, which CN '027 was published Sep. 2021.*

(Continued)

*Primary Examiner* — Erica E Cadugan
(74) *Attorney, Agent, or Firm* — Zhigang Ma (57) ABSTRACT

The present invention discloses an efficient brake disc processing device, which relates to the technical field of brake disc processing, comprising a lathe bed, an upright vertical lathe and a first power tool holder installed on a top end of the lathe bed, and an inverted vertical lathe and a second power tool holder installed on a rear side of the top end of the lathe bed, wherein the upright vertical lathe is cooperated with the second power tool holder to process an upper brake surface of a brake disc, and the inverted vertical lathe is cooperated with the first power tool holder to process a lower brake surface of the brake disc.

7 Claims, 7 Drawing Sheets

(51) Int. Cl.
  *B23B 5/02* (2006.01)
  *B23B 11/00* (2006.01)
  *B23B 13/04* (2006.01)
  *B23B 15/00* (2006.01)
  *B23B 31/103* (2006.01)
  *B23B 31/12* (2006.01)
  *B23P 23/02* (2006.01)
  *B23Q 1/66* (2006.01)
  *B23Q 7/14* (2006.01)
  *B23Q 39/04* (2006.01)
  *B24B 25/00* (2006.01)
  *B23Q 39/00* (2006.01)

(52) U.S. Cl.
  CPC ............ *B23B 31/1269* (2013.01); *B23Q 1/66* (2013.01); *B23Q 7/1436* (2013.01); *B23Q 39/04* (2013.01); *B23Q 2039/002* (2013.01); *B23Q 2039/004* (2013.01); *B23Q 2039/008* (2013.01); *B23Q 2220/004* (2013.01); *Y10T 29/511* (2015.01); *Y10T 29/5124* (2015.01); *Y10T 29/5196* (2015.01)

(58) Field of Classification Search
  CPC ............. Y10T 82/2511; Y10T 29/5196; Y10T 29/5124; Y10T 82/2514; B23B 31/1261; B23B 31/1269; B23B 5/02; B23B 2235/00–2235/045; B23B 3/065; B23B 3/10; B23B 3/162; B23B 3/165; B23B 3/168; B23B 3/30; B23B 11/00; B23B 13/04; B23Q 2039/008; B23Q 39/04; B23Q 1/66; B23Q 7/1426–7/1494; B23Q 7/1405; B23Q 41/02; B23Q 2707/003
  USPC ........ 279/106; 29/28, 27 R–27 C, 33 P, 563; 82/129, 122, 124; 198/345.3, 346.1
  See application file for complete search history.

(56) References Cited

U.S. PATENT DOCUMENTS

| | | | |
|---|---|---|---|
| 7,213,316 B2 * | 5/2007 | Kato | ................... B23Q 1/0009 483/14 |
| 10,427,221 B1 * | 10/2019 | Bermudez | ........... B23B 31/1292 |
| 2003/0024357 A1 * | 2/2003 | Hofmann | ........... B23B 31/1269 82/110 |
| 2005/0013675 A1 * | 1/2005 | Bengston | ............... B23Q 3/183 409/231 |
| 2010/0011919 A1 | 1/2010 | Creemers et al. | |
| 2011/0120816 A1 | 5/2011 | Demers | |
| 2015/0034431 A1 | 2/2015 | Wen | |
| 2020/0009634 A1 * | 1/2020 | Oshel | ................... B30B 15/028 |

FOREIGN PATENT DOCUMENTS

| | | | | |
|---|---|---|---|---|
| CN | 113172459 A | * | 7/2021 | |
| CN | 113400027 A | * | 9/2021 | |
| CN | 116025649 A | * | 4/2023 | |
| DE | 3204987 A1 | * | 8/1983 | |
| FR | 2794045 A1 | * | 12/2000 | |

OTHER PUBLICATIONS

Machine Translation of CN 116025649 A, which CN '649 was published Apr. 2023.*
Machine Translation of CN 113172459 A, which CN '459 was published Jul. 2021.*
CNIPA, Notification of First Office Action for Chinese application CN202211644478.9, Jan. 29, 2023.
CNIPA, Notification to grant patent right for Chinese application CN202211644478.9, Feb. 16, 2023.

* cited by examiner

EFFICIENT BRAKE DISC PROCESSING DEVICE

TECHNICAL FIELD

The present invention relates to the technical field of brake disc processing, and in particular to an efficient brake disc processing device.

BACKGROUND

When a brake disc is processed, corresponding processing equipment is usually required. The existing processing equipment usually uses a machine tool to conduct processing. During processing, one brake surface of the brake disc is processed first, then the brake disc is turned over, and finally, the other brake surface of the brake disc is processed. After processing, the brake disc is clamped on a grinding machine to be ground. The existing method is usually single-sided processing. During processing, one brake surface of a brake disc need to be processed first, and then the brake disc is turned over to process the other brake surface; two brake surfaces cannot be processed at one time, so the automation degree and the processing efficiency are low. When the other brake surface need to be processed, the brake disc usually need to be turned over and clamped again with manual or other semi-automated equipment, which takes a lot of time and reduces the processing efficiency; in addition, manual semi-automated equipment usually requires additional overheads, so the cost is high.

The Chinese invention patent with an application number of CN202110755770.7 discloses a piece of special equipment for brake disc and hub processing. Although automatic processing of two brake surfaces of a brake disc is realized, it is necessary for an inverted vertical lathe and an upright vertical lathe to cooperate frequently to transfer the brake disc, and the inverted vertical lathe and the upright vertical lathe need to move continuously over a large area, so the complexity of a lathe bed is increased, and production and processing errors are easy to occur during transfer; in addition, production cost is also increased by the arrangement of a loading device and an unloading device.

Therefore, the technical problem to be focused on and solved by the present solution is how to avoid frequent cooperation and transfer of the inverted vertical lathe and the upright vertical lathe and save the production cost of the loading device and the unloading device while ensuring the processing of the upper and lower end surfaces of the brake disc.

SUMMARY

The purpose of the present invention is to solve the problems that two brake surfaces cannot be processed at one time, the automation degree is low and the processing efficiency is low; avoid frequent cooperation and transfer of the inverted vertical lathe and the upright vertical lathe, and save the production cost of the loading device and the unloading device.

The present invention provides an efficient brake disc processing device, comprising a lathe bed, an upright vertical lathe and a first power tool holder installed on a top end of the lathe bed, and an inverted vertical lathe and a second power tool holder installed movably on a rear side of the top end of the lathe bed; The upright vertical lathe and an iris mechanism are cooperated with the second power tool holder to process an upper brake surface of a brake disc, the inverted vertical lathe and the iris mechanism are cooperated with the first power tool holder to process a lower brake surface of the brake disc; in this way, the fully automated processing of the two brake surfaces of the brake disc is realized, and the production efficiency is greatly increased.

Specifically, the device also comprises a material conveying system used for conveying a brake disc, and the material conveying system comprises a track assembly, moving lathes arranged on the track assembly, and the iris mechanism used for clamping the brake disc; each moving lathe comprises a support plate arranged horizontally, power wheels arranged on a bottom end of the support plate, and a rotating mechanism arranged on the support plate; the iris mechanism is connected with the rotating mechanism;

The moving lathes are arranged in a manner of being able to move horizontally between the upright vertical lathe and the second power tool holder, and between the inverted vertical lathe and the first power tool holder.

The iris mechanism comprises five lobe plates arranged in a circular array around a central point, telescopic cylinders in end connection with one corner of each lobe plate, and a power mechanism connected with the telescopic cylinders; the telescopic cylinders are connected rotatably with the rotating mechanism, an upper end surface of the support plate has a countersink hole, and the countersink hole is connected with the rotating mechanism;

An external side surface of each lobe plate is an arc surface, the center of the arc surface is located at the central point, both ends of the arc surface are provided with a concave arc surface and a convex arc surface, respectively, the center of the convex arc surface is arranged at the rotation center of the telescopic cylinder, the center of the concave arc surface is arranged at the rotation center of the telescopic cylinder on another adjacent lobe plate, and the concave arc surface and convex arc surface of two adjacent lobe plates are in contact with each other;

The five lobe plates are arranged below the support plate.

A debris baffle is arranged vertically on each of the five lobe plates along an edge of the concave arc surface, and the debris baffle is arranged below the lobe plate.

Each telescopic cylinder comprises a cylinder body and a telescopic rod arranged on the cylinder body, one end of the cylinder body passes through the support plate rotatably, and a free end of the telescopic rod is connected with the lobe plate;

The cylinder body is also connected with the power mechanism.

The power mechanism comprises driving columns arranged coaxially on one end of each cylinder body, respectively, gears arranged coaxially on the driving columns, a first synchronous belt engaged and connected simultaneously with the five gears, a driving shaft connected with one of the driving columns by a second synchronous belt, and a driving motor connected with the driving shaft; the driving motor is arranged below the support plate.

The rotating mechanism comprises a driven gear arranged horizontally in the countersink hole, a driving gear engaged with an outer side of the driven gear, and a power motor connected coaxially with the driving gear; the telescopic cylinders pass through the driven gear rotatably and vertically, a power shaft connected with the center of the driving gear passes through the support plate, and the power motor is arranged below the support plate.

Further, the lathe bed comprises a main bed and a side bed fixed on a rear side of the main bed, a side surface of the side bed is connected transversely and slidably with a first vertical frame and a second vertical frame, the inverted vertical lathe is connected vertically and slidably with the first vertical frame through a first mounting seat, the second power tool holder is connected vertically and slidably with the second vertical frame through a second mounting seat, the inverted vertical lathe is arranged on one side of the first power tool holder, and the upright vertical lathe is arranged on one side of the second power tool holder;

A third driving mechanism is installed on a top end of the first vertical frame, the inverted vertical lathe is driven by the third driving mechanism to slide vertically, a fourth driving mechanism is installed on a top end of the second vertical frame, and the second power tool holder is driven by the fourth driving mechanism to slide vertically; the moving lathes are moved horizontally, and the brake disc is driven by the iris mechanism to cooperate with the first power tool holder and the inverted vertical lathe to realize the processing of the lower brake surface of the brake disc at different positions; under the action of the iris mechanism, the brake disc can be moved vertically to cooperate with the first power tool holder and the inverted vertical lathe to realize the processing of the lower brake surface of the brake disc at different depths;

The moving lathes are moved horizontally, and the brake disc is driven by the iris mechanism to cooperate with the upright vertical lathe to realize the processing of the upper brake surface of the brake disc at different positions; the second power tool holder slides vertically to cooperate with the brake disc on the iris mechanism to realize the processing of the upper brake surface of the brake disc at different depths; in this way, the processing of the two brake surfaces of the brake disc at different positions and different depths is realized, and the method can be adapted to the processing of different specifications and types of brake discs, with a wide processing range and a strong practicability.

Further, the upright vertical lathe is installed in a middle position of the main bed, the first power tool holder is installed on one side of the main bed, two waste tanks are arranged on both sides of the main bed, and the two waste tanks are arranged correspondingly on both sides of the upright vertical lathe; the two waste tanks can be used to collect the waste produced during processing by the second power tool holder and the upright vertical lathe completely, and can also be used to collect the waste produced during processing by the inverted vertical lathe and the first power tool holder, making the processing clean and tidy, and making the device more convenient to use.

Further, an inverted chuck is installed on one end of a rotating shaft of the inverted vertical lathe, and an upright chuck is installed on one end of a rotating shaft of the upright vertical lathe; the brake disc is clamped by the iris mechanism with the cooperation of the inverted chuck, and the processing of the center, inner holes, end surfaces and part of the outer circle of the brake disc, as well as the processing technology of turning, drilling, tapping and chamfering can be realized with the cooperation of the first power tool holder; the processing of the outer circle, end surfaces and part of the inner holes of the brake disc can be realized with the cooperation of the upright chuck and the second power tool holder; in this way, the processing of the inner holes, end surfaces and outer circle of the brake disc is realized, and the processing procedures of turning, drilling, tapping and chamfering can be completed, providing a wide processing range and a strong practicability.

Further, the device also comprises a grinding machine, the second mounting seat is connected vertically and slidably with the grinding machine, a fifth driving mechanism is installed on a top end of the second mounting seat, the grinding machine is driven by the fifth driving mechanism to slide vertically, and the grinding machine is cooperated with the upright vertical lathe to grind the upper brake surface or the lower brake surface of the brake disc; a vertical position of the grinding machine is adjusted by the vertical sliding of the grinding machine; in this way, the grinding machine can be adjusted to any position, and brake discs of different sizes and types can then be ground, so the application range is wide; and also in this way, the function of brake disc grinding is provided, the processing range is increased, no additional grinding procedure is required, site occupation is alleviated, the time for brake disc transfer is saved, and the processing efficiency is increased.

Further, the bed body has a frame structure, which can play an effective role in damping, is more stable during processing, and can effectively improve the processing quality.

The present invention has the following beneficial effects:
(1) First, the upright vertical lathe is cooperated with the second power tool holder and the iris mechanism to process an upper brake surface of a brake disc, then the inverted vertical lathe is cooperated with the first power tool holder and the iris mechanism to process a lower brake surface of the brake disc; in this way, the fully automated processing of the two brake surfaces of the brake disc is realized, and the production efficiency is greatly increased;
(2) The present solution is provided with the iris mechanism, which has the following technical effects:

First, the effect of supporting a brake disc is provided by the five lobe plates, and the transfer process of the brake disc is realized under the action of the moving lathes;

Second, when the upper and lower end surfaces of the brake disc are processed, a debris baffle is arranged on a bottom surface of each lobe plate, so as to avoid the problem of processing debris bursting out of the waste tanks, and contribute to the subsequent debris collection work;

Third, when the brake disc is arranged on the upright chuck, the lobe plates also have a function of straightening the brake disc before processing the brake disc with the second power tool holder; as the brake disc drops onto the upright chuck by free fall, the position may be biased; at this time, under the clamping and pressing actions of the lobe plates, the brake disc is easy to be straightened, which provides convenience for subsequent processing;

Fourth, when the processing of the brake disc is completed, the lobe plates are driven by the telescopic cylinders to move up and down, and the lobe plates are stuck on the outer side of the brake disc to hold up and raise the brake disc, and drive the brake disc to the conveying system;

(3) The present solution is provided with the track assembly, the moving lathes slide back and forth on the track assembly, so that the loading device and the unloading device are omitted, and a feeding function is played; compared with the prior art, the present solution also eliminates a first driving mechanism used for making the first vertical frame slide transversely and a second driving mechanism used for making the second vertical frame slide transversely, so that the complexity of lathe bed processing is avoided, and the production cost is saved; with the back-and-forth horizontal movement of the moving lathes and the adjustment of the brake disc by the rotating mechanism, the cooperation of the brake disc with the first power tool holder and the second power tool holder is realized; at the same time, the frequent cooperation and transfer between the inverted vertical lathe and the upright vertical lathe in the prior art is avoided, and the processing accuracy is ensured;

(4) The present solution is provided with the telescopic cylinders which play a function of rotating shafts, i.e., the telescopic cylinders are arranged rotatably on the support plate; under the driving action of the driving columns, the lobe plates are driven by the telescopic cylinders to rotate, and the effect of rotating and lifting the lobe plates is realized.

In the figures: 1. lathe bed; 2. upright vertical lathe; 3. first power tool holder; 4. second power tool holder; 5. inverted vertical lathe; 6. side bed; 7. waste tank; 8. first vertical frame; 9. second vertical frame; 10. main bed; 11. inverted chuck; 12. upright chuck; 13. grinding machine; 20. third driving mechanism; 21. fourth driving mechanism; 22. fifth driving mechanism; 25. first mounting seat; 26. second mounting seat; 27. outer track; 28. conveying system; 29. inner track; 30. power wheel; 31. support plate; 32. iris mechanism; 321. first synchronous belt; 322. gear; 323. lobe plate; 3231. debris baffle; 324. barrier strip; 325. driving shaft; 3251. driving motor; 326. second synchronous belt; 327. telescopic cylinder; 33. driving gear; 34. power motor; 35. driven gear.

DETAILED DESCRIPTION

To deepen the understanding of the present invention, the efficient brake disc processing device of the present invention will be further described below in detail in combination with an embodiment and drawings. The embodiment is only used to explain the present invention, and does not constitute a limitation to the protection scope of the present invention.

Figure 1:
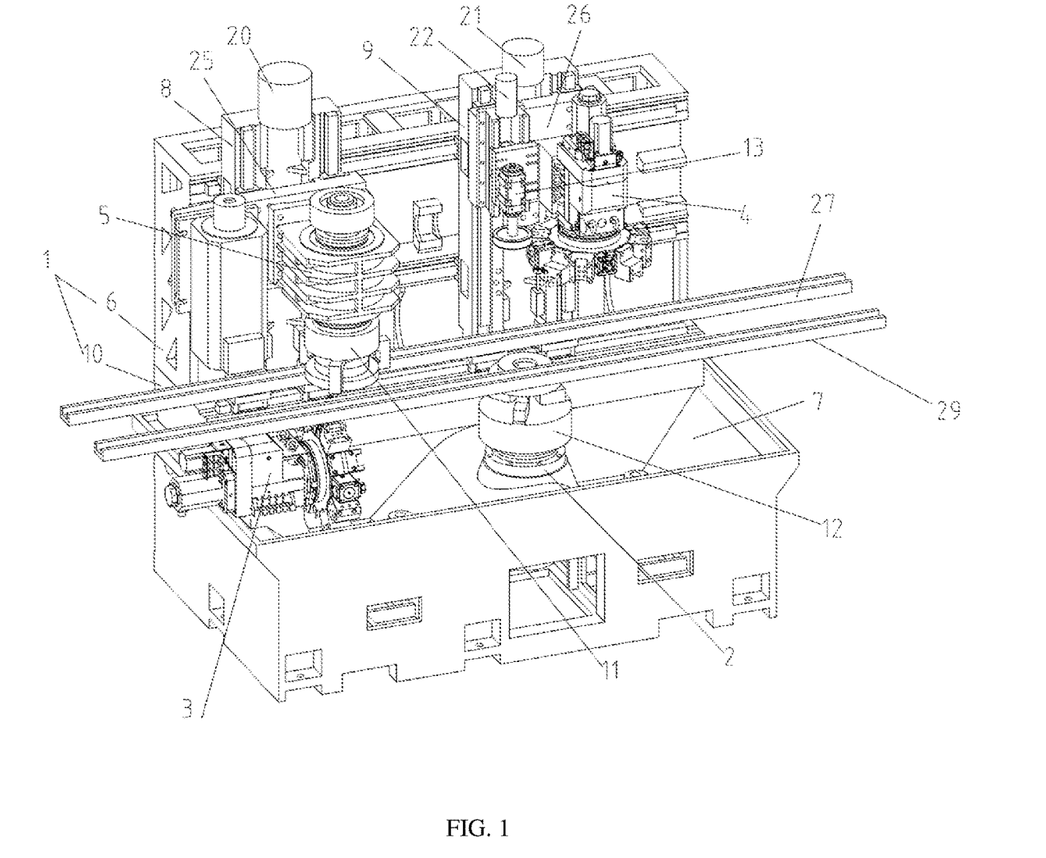
FIG. 1 is an overall structural schematic diagram of a brake disc processing device of the present invention.
Figure 2:
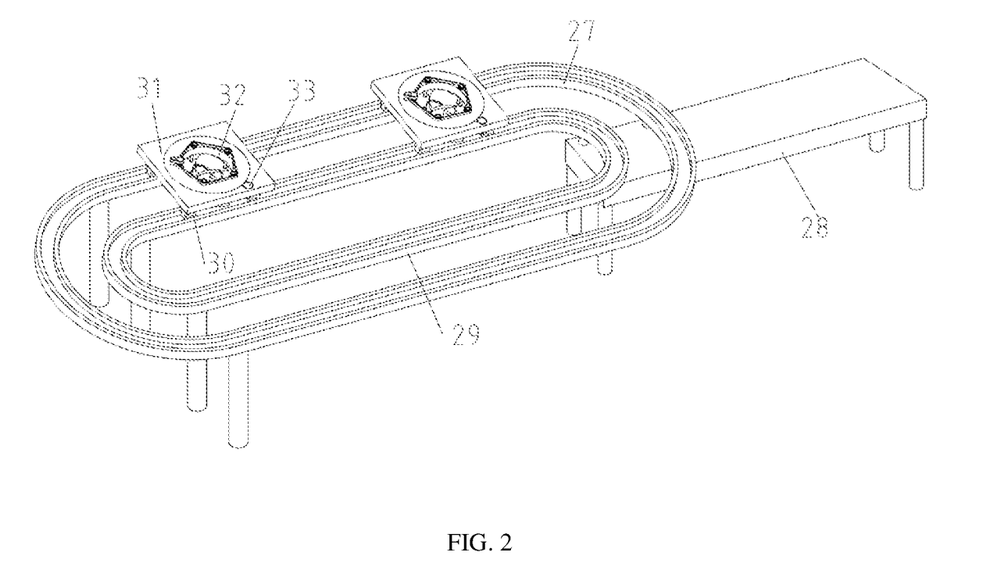
FIG. 2 is a structural schematic diagram of a material conveying system in the present invention.
Figure 3:
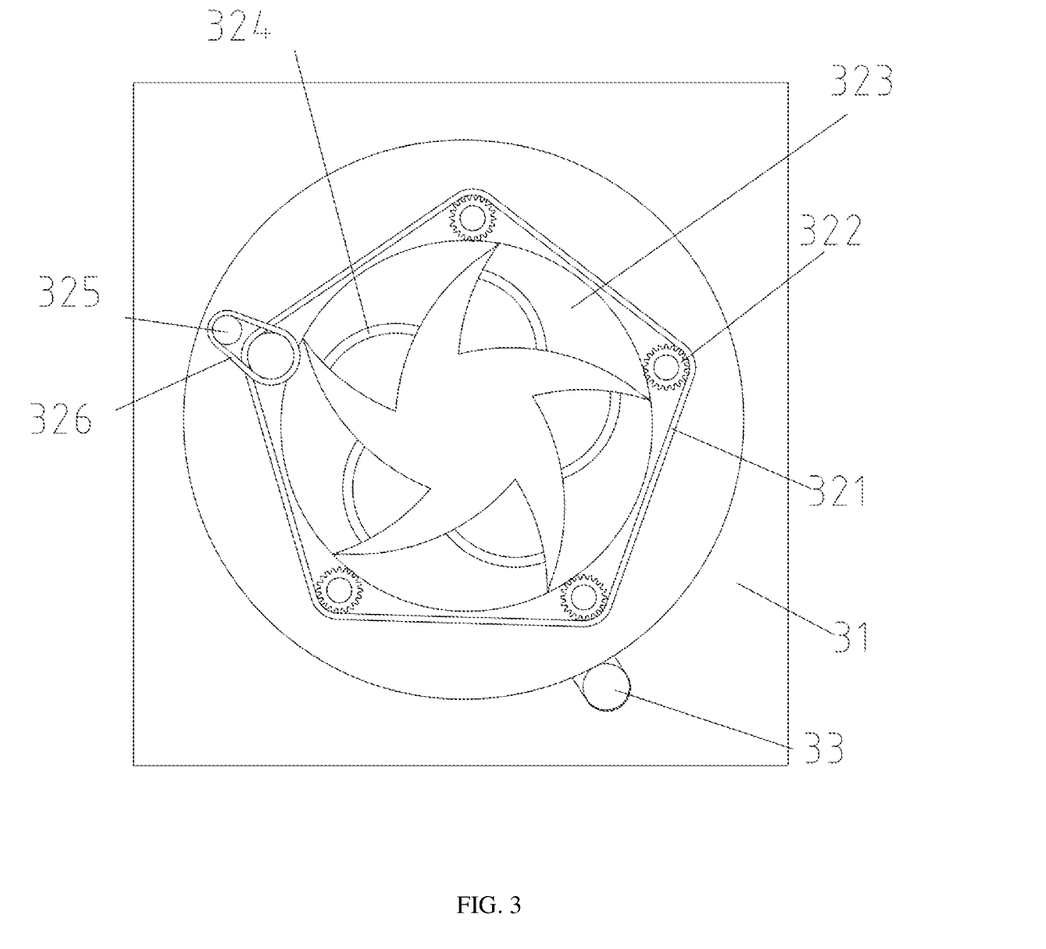
FIG. 3 is a top view of a moving lathe and an iris mechanism in the present invention.
Figure 4:
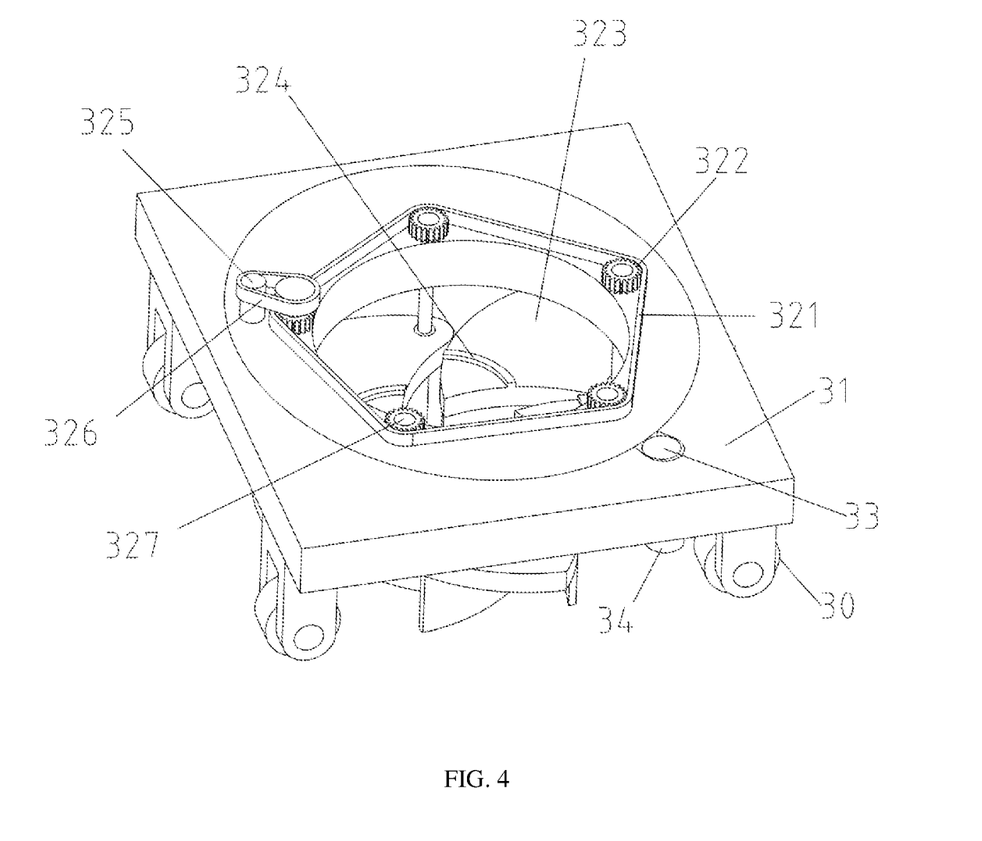
FIG. 4 is a stereographic view of a moving lathe and an iris mechanism in the present invention.

As shown in FIGS. 1-7, the present invention provides an efficient brake disc processing device, comprising a lathe bed 1, an upright vertical lathe 2 and a first power tool holder 3 installed on a top end of the lathe bed 1, and an inverted vertical lathe 5 and a second power tool holder 4 installed movably on a rear side of the top end of the lathe bed 1;

The upright vertical lathe 2 is cooperated with the second power tool holder 4 and the iris mechanism 32 to process an upper brake surface of a brake disc, and the inverted vertical lathe 5 is cooperated with the first power tool holder 3 and the iris mechanism 32 to process a lower brake surface of the brake disc; first, the upright vertical lathe 2 is cooperated with the second power tool holder 4 and the iris mechanism 32 to process an upper brake surface of a brake disc, next, the brake disc is conveyed to a position above the upright vertical lathe through a material conveying system, then the inverted vertical lathe 5 is cooperated with the first power tool holder 3 and the iris mechanism 32 to process a lower brake surface of the brake disc; in this way, the fully automated processing of the two brake surfaces of the brake disc is realized, and the production efficiency is greatly increased;

Specifically, the material conveying system comprises a track assembly, moving lathes arranged on the track assembly, and the iris mechanism 32 used for clamping the brake disc; each moving lathe comprises a support plate 31 arranged horizontally, power wheels 30 arranged on a bottom end of the support plate 31, and a rotating mechanism arranged on the support plate 31; the iris mechanism 32 is connected with the rotating mechanism;

The moving lathes are arranged in a manner of being able to move horizontally between the upright vertical lathe 2 and the second power tool holder 4, and between the inverted vertical lathe 5 and the first power tool holder 3.

Preferably, two moving lathes can be provided, contributing to the streamlined production process of a brake disc.

Preferably, the track assembly comprises an inner track 29 and an outer track 27 in a runway type, the power wheels 30 are arranged on the bottom end of the support plate 31, a plurality of power wheels 30 are provided and arranged in the inner track 29 and outer track 27, the power wheels 30 are connected with a controller used for controlling the motion state of the power wheels 30, and at the same time, the controller is connected with a driving motor 3251 and telescopic cylinders 327 used for controlling the clamping state of five lobe plates 323 and the operation of the telescopic cylinders 327, for example, the controller can be a PLC, which will not be described in detail herein.

Figure 5:
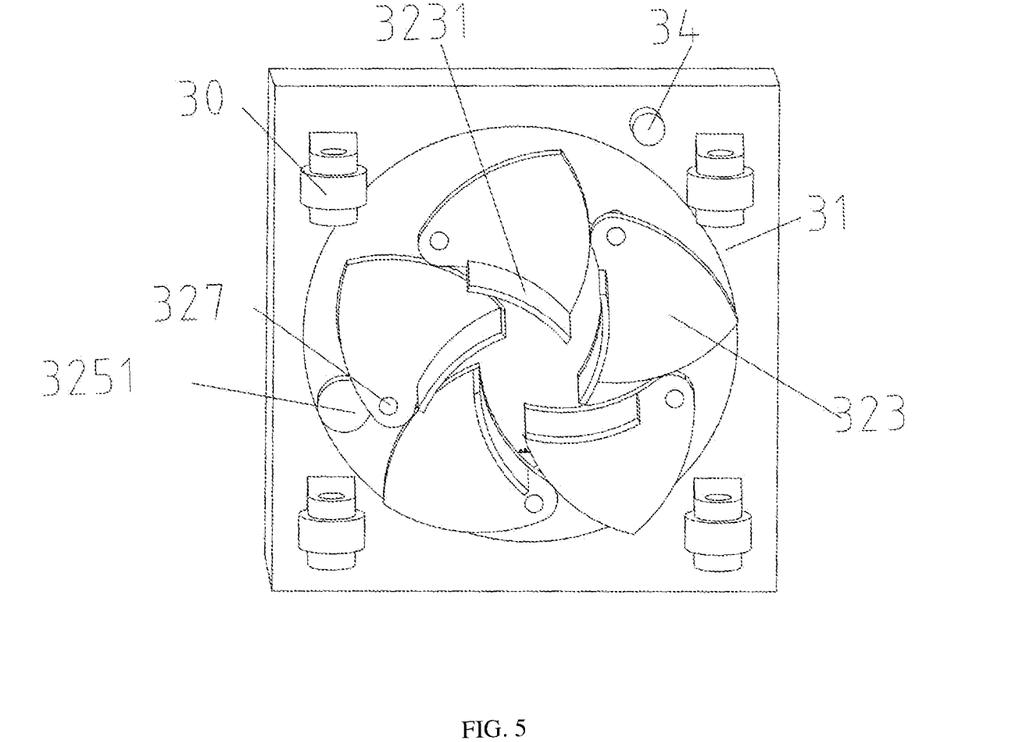
FIG. 5 is a structural schematic diagram showing bottoms of a moving lathe and an iris mechanism in the present invention.
Figure 6:
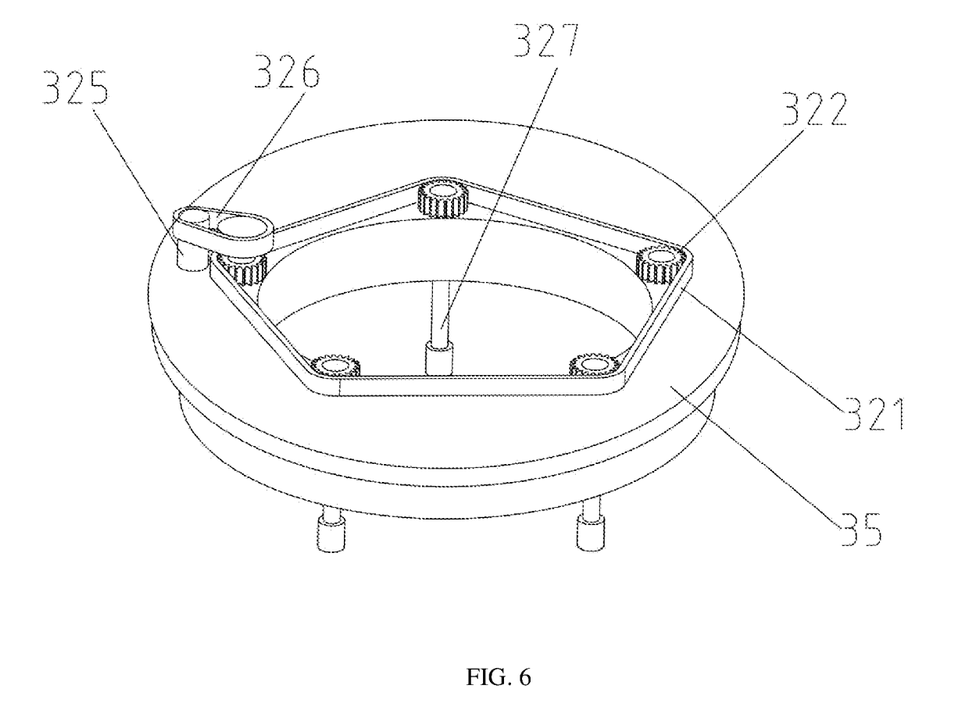
FIG. 6 is a structural schematic diagram of a power mechanism in the present invention.
Figure 7:
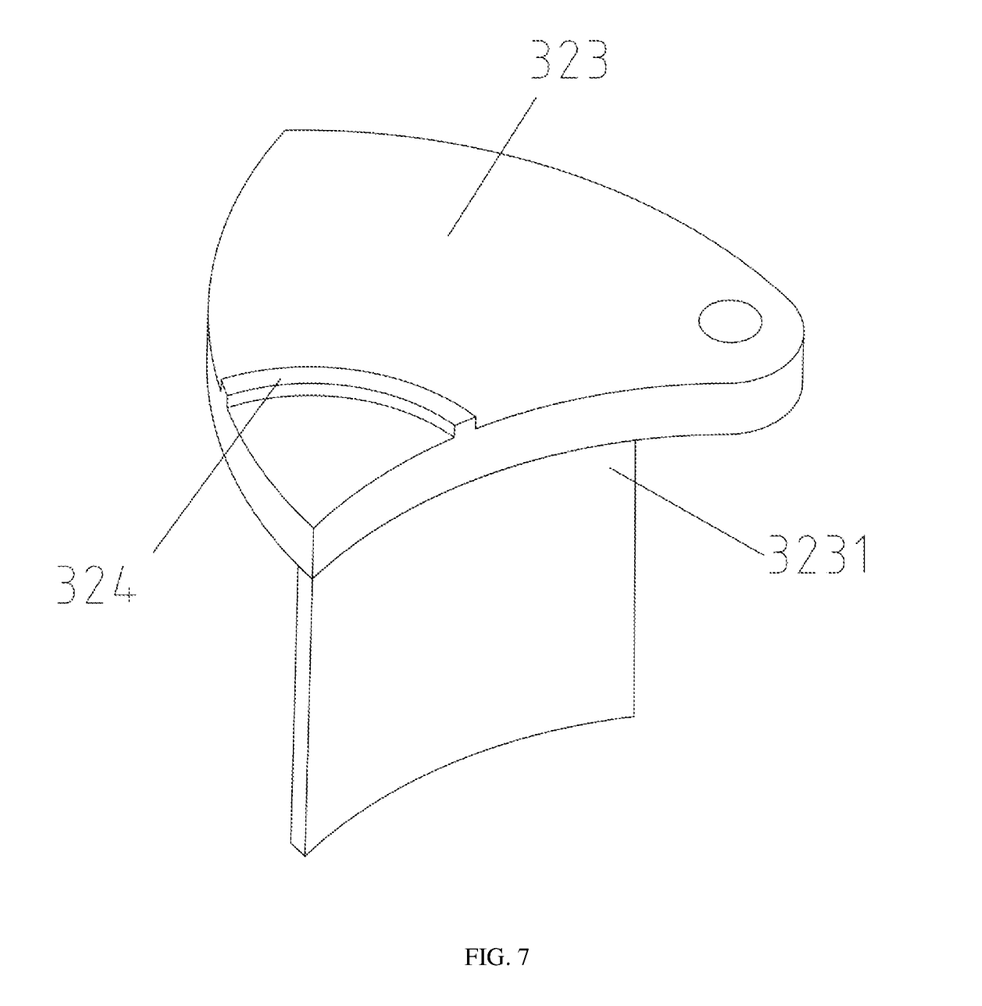
FIG. 7 is a schematic diagram of a connecting structure of a lobe plate in the present invention.

An innovation of the present solution is that the telescopic cylinders 327 are also used as rotating shafts on the lobe plates; under the action of the driving motor, the telescopic cylinders 327 play a function of rotating shafts; and under the action of gears 322 and a first synchronous belt 321, the lobe plates 323 are driven to rotate;

Preferably, a barrier strip 324 is arranged on an upper end surface of each lobe plate 323, which can be used to support and limit the position of a brake disc. The iris mechanism 32 comprises the five lobe plates 323 arranged in a circular array around a central point, the telescopic cylinders 327 in end connection with one corner of each lobe plate 323, and a power mechanism connected with the telescopic cylinders 327; the telescopic cylinders 327 are connected rotatably with the rotating mechanism, an upper end surface of the support plate 31 has a countersink hole, and the countersink hole is connected with the rotating mechanism;

An external side surface of each lobe plate 323 is an arc surface, the center of the arc surface is located at the central point, both ends of the arc surface are provided with a concave arc surface and a convex arc surface, respectively, the center of the convex arc surface is arranged at the rotation center of the telescopic cylinder 327, the center of the concave arc surface is arranged at the rotation center of the telescopic cylinder 327 on another adjacent lobe plate 323, and the concave arc surface and convex arc surface of two adjacent lobe plates 323 are in contact with each other;

The five lobe plates 323 are arranged below the support plate 31.

A debris baffle 3231 is arranged vertically on each of the five lobe plates 323 along an edge of the concave arc surface, and the debris baffle 3231 is arranged below the lobe plate 323.

Each telescopic cylinder 327 comprises a cylinder body and a telescopic rod arranged on the cylinder body, one end of the cylinder body passes through the support plate 31 rotatably, and a free end of the telescopic rod is connected with the lobe plate 323; the cylinder body is also connected with the power mechanism.

The power mechanism comprises driving columns arranged coaxially on one end of each cylinder body, respectively, gears 322 arranged coaxially on the driving columns, a first synchronous belt 321 engaged and connected simultaneously with the five gears 322, a driving shaft 325 connected with one of the driving columns by a second synchronous belt 326, and the driving motor 3251 connected with the driving shaft 325; the driving motor 3251 is arranged below the support plate 31.

The rotating mechanism comprises a driven gear 35 arranged horizontally in the countersink hole, a driving gear 33 engaged with an outer side of the driven gear 35, and a power motor 34 connected coaxially with the driving gear 33; the telescopic cylinders 327 pass through the driven gear 35 rotatably and vertically, a power shaft connected with the center of the driving gear 33 passes through the support plate 31, and the power motor 34 is arranged below the support plate 31. The driving gear 33 is driven by the action of the power motor 34 to rotate, the driven gear 35 is driven by the driving gear 33 to rotate, the iris mechanism 32 is driven by the driven gear 35 to rotate, and thus the brake disc is driven to rotate, replacing the rotation effect of the upright vertical lathe or the inverted vertical lathe.

The lathe bed 1 comprises a main bed 10 and a side bed 6 fixed on a rear side of the main bed 10, a side surface of the side bed 6 is connected transversely and slidably with a first vertical frame 8 and a second vertical frame 9, the inverted vertical lathe 5 is connected vertically and slidably with the first vertical frame 8 through a first mounting seat 25, the second power tool holder 4 is connected vertically and slidably with the second vertical frame 9 through a second mounting seat 26, the inverted vertical lathe 5 is arranged on one side of the first power tool holder 3, and the upright vertical lathe 2 is arranged on one side of the second power tool holder 4;

A third driving mechanism 20 is installed on a top end of the first vertical frame 8, the inverted vertical lathe 5 is driven by the third driving mechanism 20 to slide vertically, a fourth driving mechanism 21 is installed on a top end of the second vertical frame 9, and the second power tool holder 4 is driven by the fourth driving mechanism 21 to slide vertically; the moving lathes are moved horizontally, and the brake disc is driven to cooperate with the first power tool holder 3 and the iris mechanism 32 to realize the processing of the lower brake surface of the brake disc at different positions; the inverted vertical lathe 5 slides vertically on the first vertical frame 8 to cooperate with the first power tool holder 3 and the iris mechanism 32 to realize the processing of the lower brake surface of the brake disc at different depths;

The moving lathes are moved horizontally, and the brake disc is driven to cooperate with the iris mechanism 32 to realize the processing of the upper brake surface of the brake disc at different positions; the second power tool holder 4 slides vertically to cooperate with the iris mechanism 32 to realize the processing of the upper brake surface of the brake disc at different depths; in this way, the processing of the two brake surfaces of the brake disc at different positions and different depths is realized, and the method can be adapted to the processing of different specifications and types of brake discs, with a wide processing range and a strong practicability;

The upright vertical lathe 2 is installed in a middle position of the main bed 10, the first power tool holder 3 is installed on one side of the main bed 10, two waste tanks 7 are arranged on both sides of the main bed 10, and the two waste tanks 7 are arranged correspondingly on both sides of the upright vertical lathe 2; the two waste tanks 7 can be used to collect the waste produced during processing by the second power tool holder 4 and the upright vertical lathe 2 completely, and can also be used to collect the waste produced during processing by the inverted vertical lathe 5 and the first power tool holder 3, making the processing clean and tidy, and making the device more convenient to use;

An inverted chuck 11 is installed on one end of a rotating shaft of the inverted vertical lathe 5, and an upright chuck 12 is installed on one end of a rotating shaft of the upright vertical lathe 2; the brake disc is clamped by the iris mechanism 32 with the cooperation of the inverted chuck 11, and the processing of the center, inner holes, end surfaces and part of the outer circle of the brake disc, as well as the processing technology of turning, drilling, tapping and chamfering can be realized with the cooperation of the first power tool holder 3;

The processing of the outer circle, end surfaces and part of the inner holes of the brake disc can be realized with the cooperation of the upright chuck 12 and the second power tool holder 4 when the brake disc is clamped by the iris mechanism 32; in this way, the processing of the inner holes, end surfaces and outer circle of the brake disc is realized, and the processing procedures of turning, drilling, tapping and chamfering can be completed, providing a wide processing range and a strong practicability;

The device also comprises a grinding machine 13, the second mounting seat 26 is connected vertically and slidably with the grinding machine 13, a fifth driving mechanism 22 is installed on a top end of the second mounting seat 26, the grinding machine 13 is driven by the fifth driving mechanism 22 to slide vertically, and the grinding machine 13 is cooperated with the upright vertical lathe 2 to grind the upper brake surface and the lower brake surface of the brake disc; the grinding machine 13 is driven by the second vertical frame 9 to move transversely and adjust a transverse position of the grinding machine 13, and a vertical position of the grinding machine 13 is adjusted by the vertical sliding of the grinding machine 13; in this way, the grinding machine 13 can be adjusted to any position, and brake discs of different sizes and types can then be ground, so the application range is wide; and also in this way, the function of brake disc grinding is provided, the processing range is increased, no additional grinding procedure is required, site occupation is alleviated, the time for brake disc transfer is saved, and the processing efficiency is increased;

It should be noted that: the upright vertical lathe 2, the first power tool holder 3, the second power tool holder 4 and the inverted vertical lathe 5 in the present solution belong to commonly used components in a machine tool, and the present solution can be realized by using the commonly used components in the existing machine tool.

The inverted chuck 11 and the upright chuck 12 can be electric chucks commonly used in the existing machine tool;

The third driving mechanism 20, the fourth driving mechanism 21 and the fifth driving mechanism 22 mainly play a role of providing power, and the mode of driving lead screws by motors commonly used in the existing machine tool can be adopted;

The specific working process of the present invention is as follows:

On the track assembly, a brake disc is placed on the lobe plates 323 by a mechanical arm, so that the brake disc is propped up by the lobe plates 323, and the moving lathe is moved to a position below the inverted chuck 11 by the power wheels 30; then the inverted vertical lathe 5 is driven by the third driving mechanism 20 to slide downwards to approach the workpiece, and an upper part of the brake disc is clamped and fixed by the inverted chuck 11 on one end of the inverted vertical lathe 5; the five lobe plates 323 are opened simultaneously under the action of the driving motor 3251, the brake disc is driven by the inverted chuck 11 to be lowered, a lower end of the brake disc is clamped by the five lobe plates, and the brake disc is driven to move downwards and come into contact with the first power tool holder to start processing under the action of the telescopic cylinders 327.

First of all, the processing of a first procedure is conducted; under the action of the back-and-forth movement of the moving lathe and the rotation of the rotating mechanism, the processing of the center, inner holes, end surfaces and part of the outer circle of an upper brake surface of the brake disc, as well as the processing technology of turning, drilling, tapping and chamfering can be realized with the cooperation of the first power tool holder 3 and the iris mechanism 32;

After the processing is completed, the brake disc is driven by the telescopic cylinders 327 to rise up, an upper end of the brake disc is clamped by the inverted chuck 11, and the brake disc is placed on the five lobe plates 323; the moving lathe is controlled to move and reach a position above the upright vertical lathe 2, at the same time, the five telescopic cylinders 327 are started to make the lobe plates 323 lowered and rest above the upright vertical lathe 2, and the upright chuck 12 is extended into the inside of the brake disc; at this time, the driving motor 3251 works to open the lobe plates 323, an inner side surface of the brake disc is propped up by a plurality of barrier strips 324, and three claws of the upright chuck 12 come into contact with the inner side surface of the brake disc to be used as a datum point for judging processing; subsequently, the brake disc is raised to separate from the upright chuck 12 and come into contact with the second power tool holder 4; then the processing of a second procedure is conducted, and the processing of the center, inner holes, end surfaces and part of the outer circle of the upper brake surface of the brake disc, as well as the processing technology of turning, drilling, tapping and chamfering can be realized with the cooperation of the second power tool holder 4 and the iris mechanism 32;

Next, the grinding machine 13 is controlled to move, the grinding machine 13 is cooperated with the iris mechanism 32 to grind the upper brake surface or the lower brake surface of the brake disc; after grinding is completed, the five lobe plates 323 are closed, and the brake disc is conveyed to a position above a conveying system 28 under the action of the moving lathe to be removed by a mechanical arm or manually.

Note: the brake disc processing device provided by the present solution is a modification in the prior art, wherein the upright vertical lathe 2 and the upright chuck 12 can be removed in the present solution, but the alignment of the datum point shall be considered, that is, the three claws of the upright chuck 12 are in contact with the inner side surface of the brake disc to judge whether the brake disc is on a processing center of the second power tool holder 4.

The above is just a preferred embodiment of the present invention and is not intended to limit the present invention. Any modification, equivalent replacement, improvement, etc. made within the spirit and the principle of the present invention shall be contained within the protection scope of the present invention.

The invention claimed is:

1. A brake disc processing device for processing brake discs, the processing device comprising:
   a lathe bed (1);
   an upright vertical lathe (2) installed on a top end of the lathe bed;
   a first power tool holder (3) installed on the top end of the lathe bed (1);
   an inverted vertical lathe (5) installed on a rear side of the top end of the lathe bed; and
   a second power tool holder (4) installed on the rear side of the top end of the lathe bed (1);
   a material conveying system used for conveying at least one of the brake discs, the material conveying system comprising:
   a track assembly, and
   moving lathes arranged on the track assembly, each of the moving lathes comprising:
      a respective iris mechanism (32) used for clamping a respective one of the brake discs;
      a respective support plate (31) arranged horizontally,
      a respective set of power wheels (30) arranged on a bottom end of the respective support plate (31), and
      a respective rotating mechanism arranged on the respective support plate (31) and connected with the corresponding iris mechanism (32);
   wherein the moving lathes are arranged in a manner of being able to move horizontally along the track system to a location that is between the upright vertical lathe (2) and the second power tool holder (4), and are able to move horizontally along the track system to a further location that is between the inverted vertical lathe (5) and the first power tool holder (3);
   wherein the upright vertical lathe (2) cooperates with the second power tool holder (4) and one of the iris mechanisms (32) of one of the moving lathes to process an upper brake surface of the brake disc clamped by the one iris mechanism (32), and wherein the inverted vertical lathe (5) cooperates with the first power tool holder (3) and the one iris mechanism (32) to process a lower brake surface of the brake disc clamped by the one iris mechanism (32);
   wherein each of the iris mechanisms (32) comprises:
   a respective set of five lobe plates (323) arranged in a circular array around a central point,
   a respective set of telescopic cylinders (327), each of the lobe plates (323) having a respective corner that is in connection with a respective end of a respective one of the telescopic cylinders (327), and
   a respective power mechanism, wherein for each of the iris mechanisms, the respective power mechanism is connected with the respective set of telescopic cylinders (327);
   wherein for each of the iris mechanisms, each of the telescopic cylinders (327) of the respective set of telescopic cylinders (327) is connected rotatably with the corresponding rotating mechanism of the corresponding moving lathe,
   wherein for each of the support plates (31), a respective upper end surface of the respective support plate (31) has a respective countersink hole, and each of the countersink holes is connected with the corresponding rotating mechanism;
   wherein a respective external side surface of each of the lobe plates (323) is an arc surface, wherein for each of the lobe plates (323), the respective center of the arc of the respective arc surface is located at the corresponding central point, wherein each of the arc surfaces has a corresponding two opposite ends, wherein for each of the arc surfaces, the corresponding one of the ends is provided with a respective concave arc surface and the corresponding other one of the ends is provided with a respective convex arc surface, wherein for each of the lobe plates (323), the respective center of the arc of the respective convex arc surface is arranged at the corresponding rotation center of the corresponding one of the telescopic cylinders (327), wherein for each of the lobe plates (323), the respective center of the arc of the respective concave arc surface is arranged at the rotation center of the telescopic cylinder (327) on an adjacent one of the lobe plates (323), and wherein the concave arc surface of one of the lobe plates (323) is adjacent to the convex arc surface of an adjacent one of the lobe plates (323);

wherein for each of the moving lathes, the corresponding five lobe plates (323) are arranged below the corresponding support plate (31);

wherein for each of the iris mechanisms, a respective debris baffle (3231) is arranged vertically on each of the corresponding five lobe plates (323) along a respective edge of the corresponding concave arc surface, and each of the debris baffles (3231) is arranged below the corresponding one of the lobe plates (323);

wherein each of the telescopic cylinders (327) comprises a respective cylinder body and a respective telescopic rod arranged on the corresponding cylinder body, such that for each of the telescopic cylinders (327): (i) a respective one end of the cylinder body passes through the corresponding support plate (31) rotatably, and (ii) a respective free end of the telescopic rod is connected with the corresponding one of the lobe plates (323); and wherein each of the cylinder bodies is connected with the power mechanism of the corresponding iris mechanism.

2. The brake disc processing device according to claim 1, wherein each of the power mechanisms comprises:
   driving columns each arranged coaxially on a respective one end of each of the cylinder bodies,
   gears (322) each arranged coaxially on a respective one of the driving columns,
   a first synchronous belt (321) engaged and connected simultaneously with the corresponding five gears (322),
   a driving shaft (325) connected with one of the driving columns by a second synchronous belt (326), and
   a driving motor (3251) connected with the driving shaft (325); the driving motor (3251) is arranged below the corresponding support plate (31).

3. The brake disc processing device according to claim 2, wherein each of the rotating mechanisms comprises:
   a driven gear (35) arranged horizontally in the corresponding countersink hole,
   a driving gear (33) engaged with an outer side of the driven gear (35) and having a center that is connected to a power shaft, and
   a power motor (34) connected coaxially with the driving gear (33);

wherein for each of the rotating mechanisms: (i) the telescopic cylinders (327) of the corresponding set of telescoping cylinders (327) pass through the corresponding driven gear (35) rotatably and vertically, (ii) the corresponding power shaft passes through the corresponding support plate (31), and (iii) the corresponding power motor (34) is arranged below the corresponding support plate (31).

4. The brake disc processing device according to claim 1, wherein the lathe bed (1) comprises: a main bed (10) and a side bed (6) fixed on a rear portion of the main bed (10), wherein a side surface of the side bed (6) is connected slidably with both a first vertical frame (8) and a second vertical frame (9), wherein the inverted vertical lathe (5) is connected slidably with the first vertical frame (8) via a first mounting seat (25), wherein the second power tool holder (4) is connected slidably with the second vertical frame (9) via a second mounting seat (26), wherein the inverted vertical lathe (5) is arranged on one side of the first power tool holder (3), and the upright vertical lathe (2) is arranged on one side of the second power tool holder (4);

wherein a third driving mechanism (20) is installed on a top end of the first vertical frame (8), and the inverted vertical lathe (5) is driven by the third driving mechanism (20) to slide vertically, and wherein a fourth driving mechanism (21) is installed on a top end of the second vertical frame (9), and the second power tool holder (4) is driven by the fourth driving mechanism (21) to slide vertically.

5. The brake disc processing device according to claim 4, wherein the upright vertical lathe (2) is installed in a middle position of the main bed (10), wherein the first power tool holder (3) is installed on one side of the main bed (10), and wherein two waste tanks (7) are arranged such that one of the waste tanks (7) is on a first side of the main bed (1) and the other of the waste tanks (7) is arranged on an opposite side of the main bed (10), and wherein the one of the two waste tanks (7) is arranged on one side of the upright vertical lathe (2) and wherein the other of the waste tanks (7) is arranged on an opposite side of the upright vertical lathe (2).

6. The brake disc processing device according to claim 5, wherein an inverted chuck (11) is installed on one end of a rotating shaft of the inverted vertical lathe (5), and wherein an upright chuck (12) is installed on one end of a rotating shaft of the upright vertical lathe (2).

7. The brake disc processing device according to claim 4, wherein the device also comprises a grinder (13), wherein the second mounting seat (26) is connected slidably with the grinder (13), wherein a fifth driving mechanism (22) is installed on a top end of the second mounting seat (26), wherein the grinder (13) is driven by the fifth driving mechanism (22) to slide vertically, and wherein the grinder (13) is cooperated with the upright vertical lathe (2) to grind the upper brake surface or the lower brake surface of one of the brake discs.

* * * * *